United States Patent

[11] 3,575,554

[72] Inventor William G. Schmidt
Rockville, Md.

[21] Appl. No. 721,756

[22] Filed Apr. 16, 1968

[45] Patented Apr. 20, 1971

[73] Assignee Communications Satellite Corporation
Washington, D.C.

[54] FRAME SYNCHRONIZER FOR A BIORTHOGONAL DECODER
6 Claims, 15 Drawing Figs.

[52] U.S. Cl. .......... 178/69.5, 340/172.5, 325/325

[51] Int. Cl. .......... H04l 1/10

[50] Field of Search .......... 178/69.5; 235/181; 340/172.5, (Inquired); 307/269; 179/15 (OR), (Inquired); 325/55, 62, 63, 42, 321, 325, (Inquired)

[56] References Cited

UNITED STATES PATENTS

| | | | |
|---|---|---|---|
| 3,305,636 | 2/1967 | Webb .......... | 178/69.5 |
| 3,402,265 | 9/1968 | Couvillon .......... | 178/69.5 |
| 3,412,334 | 11/1968 | Whitaker .......... | 325/325 |
| 3,463,911 | 8/1969 | Dupraz et al. .......... | 235/181 |

*Primary Examiner*—Robert L. Griffin
*Assistant Examiner*—John C. Martin
*Attorney*—Sughrue, Rothwell, Mion, Zinn & MacPeak

ABSTRACT: An 8-bit word having good autocorrelation properties is recirculated through an eight stage shift register at a receiving station to simultaneously generate the eight phases of the word. At the same time, a sending station having an 8-bit frame length transmits a repeating sequence of the same word. The transmitted word, now corrupted by channel noise, is then correlation detected with the eight phases of itself generated at the receiving station. The phase producing the largest correlation output is selected as the synchronized phase or frame, and is used to generate framing pulses during the subsequent data transmission.

INVENTOR
WILLIAM G. SCHMIDT

BY Sughrue, Rothwell, Mion, Zinn & Macpeak

ATTORNEYS

FRAME SYNCHRONIZER FOR A BIORTHOGONAL DECODER

BACKGROUND OF THE INVENTION

This invention relates to an electronic apparatus for frame synchronizing an orthogonal or biorthogonal decoder with an incoming data transmission.

Digital data transmission differs from analog transmission not only in the discrete versus continuous manner of signaling, but also in that a digital transmission involves both clock and word synchronization as well as actual data. Digital data transmission employing the orthogonal or biorthogonal form of pulse coding is particularly useful in communications environments characterized by poor signal-to-noise ratios owing to its low error probability in the face of such conditions, but the same high noise factor presents considerable problems in achieving the necessary clock and word synchronization. Orthogonal and biorthogonal coding per se is well known in the art, and is described at length in the text "Digital Communications With Space Applications" edited by S.W. Golomb and published by Prentice-Hall in 1964 on pages 51—53. There are a number of varied prior art teachings directed towards synchronization techniques for digital communications systems, such as U.S. Pat. No. 2,984,706, but the requirement for achieving synchronization in a low SNR environment leaves comparatively few that are effective and reliable enough for use in systems employing orthogonal or biorthogonal coding. This invention is therefore concerned with a word or frame synchronization technique which produces exceptionally fast and reliable acquisition under poor SNR conditions, and which achieves same very economically in a digital communications system employing orthogonal or biorthogonal coding since it may be largely implemented using the existing data decoding circuitry.

SUMMARY OF THE INVENTION

In a preferred embodiment, the apparatus of this invention provides means for simultaneously comparing, by correlation, detection, a received frame synchronization word with each possible, locally generated, phase of the word. Means are provided for sampling all of the correlation detection outputs, and the largest one, corresponding to the phase comparison, produces a pulse that energizes a decoder responsive to the selected phase. Each time the selected phase is subsequently generated, which is once each frame or word period, the decoder produces the desired synchronizing pulse. The correlation detection and the sampling and selecting circuitry used are components of the existing data decoder, and thus considerable hardware economies are realized. Since the basic frame synchronization technique itself involves orthogonal coding and correlation detection decoding, it exhibits exceptional speed and reliability in poor SNR environments as compared with the prior art, and complete frame synchronization within a few frame periods is easily obtainable.

BRIEF DESCRIPTION OF THE DRAWINGS

The foregoing and other objects, features and advantages of the invention will be apparent from the following more particular description of a preferred embodiment of the invention, as illustrated in the accompanying drawings in which.

DESCRIPTION OF THE PREFERRED EMBODIMENT

Figure 1:
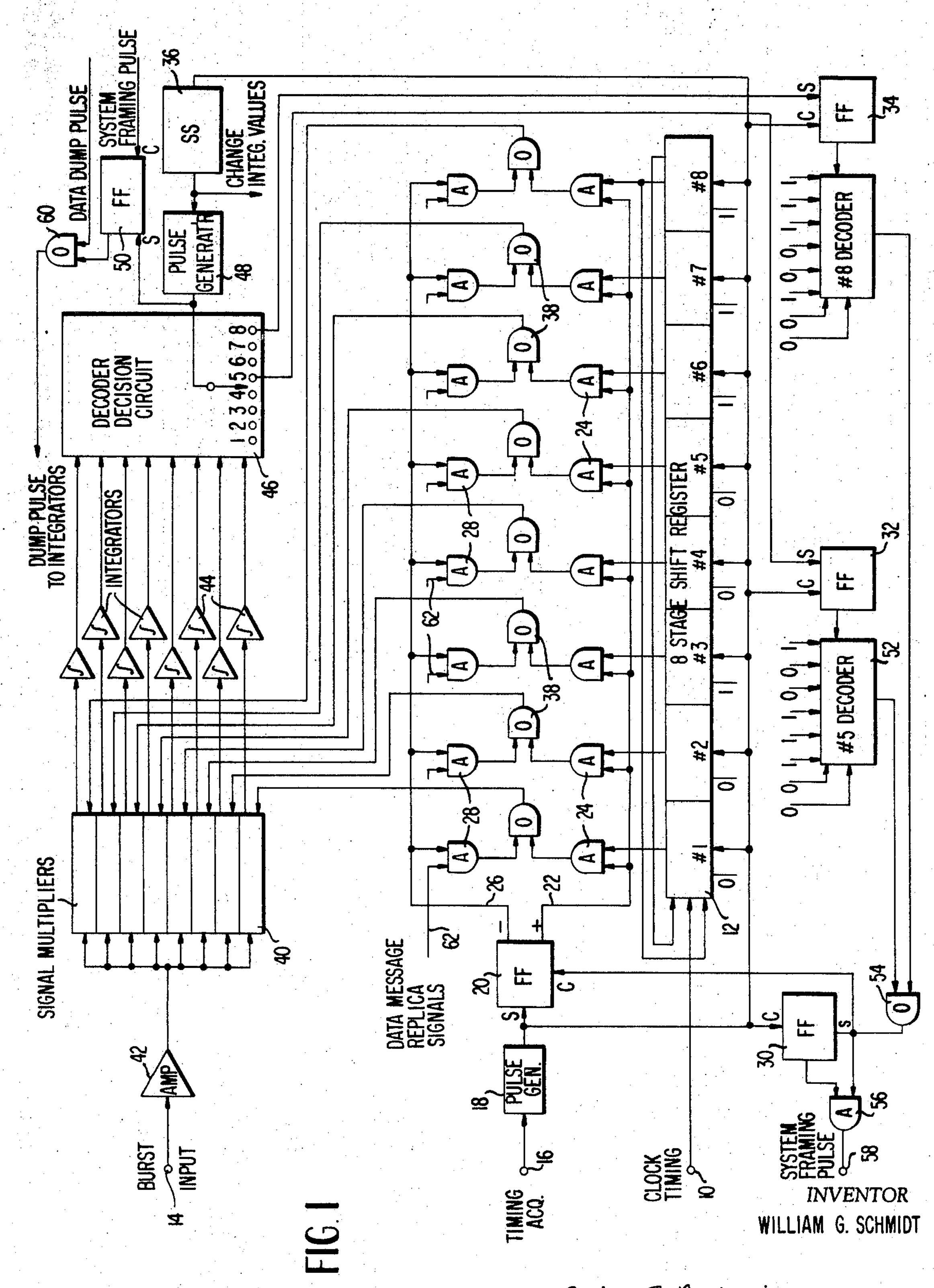
FIG. 1 shows a logic block diagram of a frame synchronizer constructed in accordance with the teachings of this invention.

In the description to follow, it will be assumed that burst transmissions are employed and that the data is biorthogonally coded. The first portion of each burst contains only the unmodulated carrier to enable the demodulator at the receiver to achieve frequency and phase coherence, i.e., carrier recovery. The second portion of each burst consists of the carrier modulated by a clock recovery or synchronizing signal, usually a repeating train of pulses. The third portion contains a repeating sequence of a frame synchronizing word having good autocorrelation properties, as mentioned earlier, while the remainder of each burst contains the biorthogonally coded data bits. This invention is concerned only with frame synchronization involving the third portion of each data burst, and it will be further assumed throughout that both carrier and clock recovery have already been achieved by separate circuitry, not shown.

The particular synchronization word employed in the following description is the 8-bit binary sequence 11100100, although this is by way of example only and a number of other words having good autocorrelation properties would suffice equally well. The length of 8-bits is chosen to correspond to the word length employed in the overall data communications system. The following table is an autocorrelation plot of the frame synchronization word 11100100.

| Sequence | Like bits | Unlike bits | Sum |
|---|---|---|---|
| 11100100 | 8 | 0 | +8 |
| 01110010 | 4 | 4 | 0 |
| 00111001 | 2 | 6 | −4 |
| 10011100 | 4 | 4 | 0 |
| 01001110 | 4 | 4 | 0 |
| 00100111 | 4 | 4 | 0 |
| 10010011 | 2 | 6 | −4 |
| 11001001 | 4 | 4 | 0 |

The table shows each of the eight phases of the selected word and lists the number of bit coincidences and differences between each phase and the initial or reference phase. By assigning a value of +1 to the coincidences and −1 to the differences, a sum column is obtained which shows that only the in phase sequence has a positive summation, all others having zero or negative values.

In the circuit described below, the reference phase 11100100 is repetitively transmitted immediately following the clock synchronization period. At the same time, the eight phases or sequences of the word are simultaneously generated at the receiver in a recirculating shift register. Each phase is compared with the received reference phase by multiplication of the two together and integrating the results of each multiplication, i.e., correlation detection. After a suitable number of frame periods, all integrations except one will be near zero or very negative, from the above table; the exception being the integration associated with the in phase sequence of the framing word which will be very positive. Means forming a part of the biorthogonal decoding circuitry of the receiver are used to sample the integrations and produce a pulse on one of eight selection lines identifying the in phase sequence. This pulse energizes a simple logic decoder that generates an output pulse whenever the selected or in phase sequence is present in the shift register. This output pulse serves as the desired frame synchronization pulse for subsequent data transmissions, and is generated at the beginning of each frame or word period.

Figure 2:
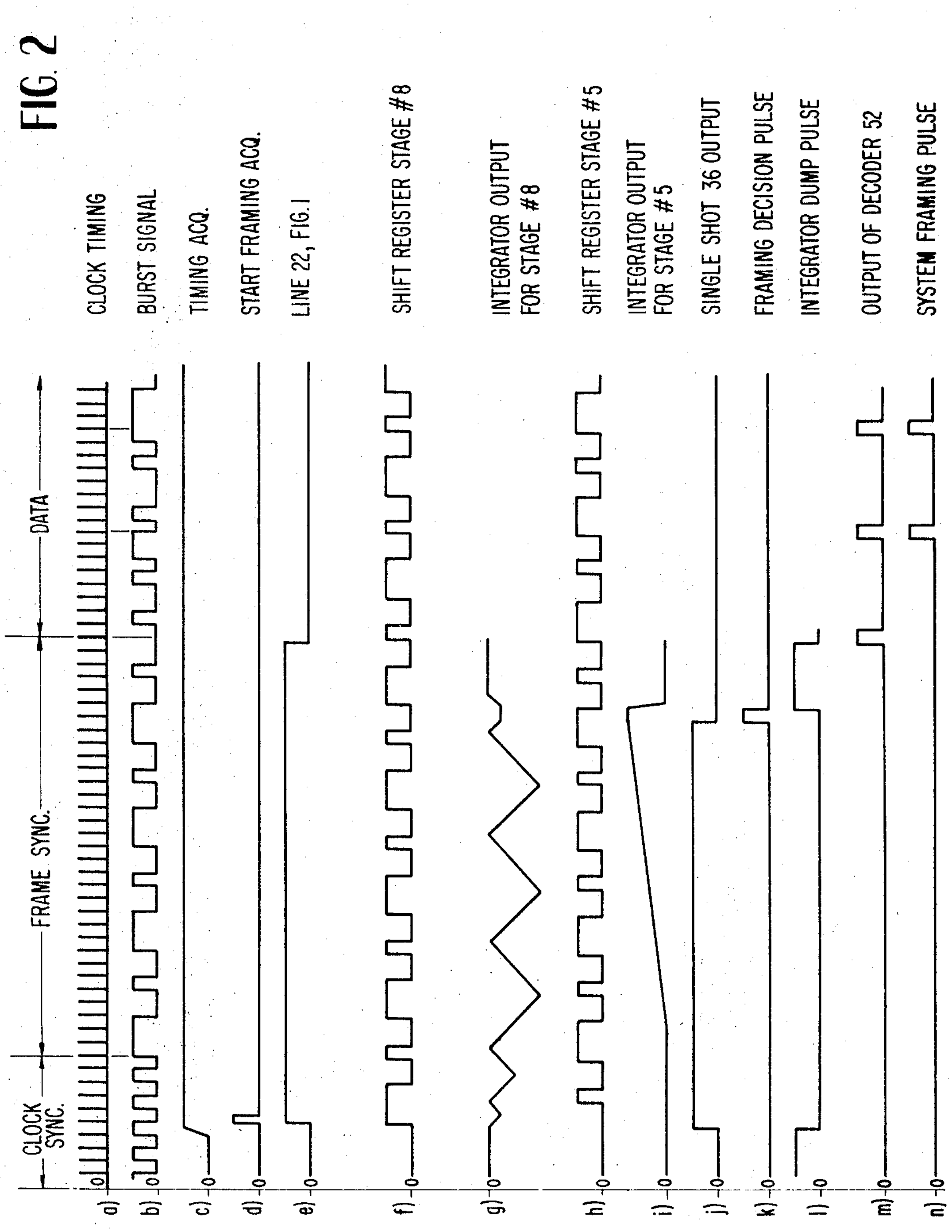
FIGS. 2a—2n show time plots of the various waveforms appearing in the diagram of FIG. 1.

Referring now to the drawings, FIG. 2*a* shows the clock timing signal applied to input terminal 10 in FIG. 1, coupled directly to the stepping input of an eight stage shift register 12. FIG. 2*b* shows the demodulated burst signal, including clock synchronization, frame synchronization and data portions, applied to input terminal 14 in FIG. 1, while FIG. 2*c* shows the clock timing acquisition signal applied to input terminal 16.

Frame synchronization is initiated by a short pulse, FIG. 2*d*, developed by the pulse generator 18 in response to the timing acquisition signal applied to input terminal 16. This pulse is applied to the set input of flip-flop 20 whose raised output on line 22, FIG. 2*e*, enables AND gates 24 while its lowered output on line 26 disables AND gates 28. The start pulse from generator 18 also clears or resets flip-flops 30, 32 and 34, and six other flip-flops associated with six additional decoders, not shown, triggers single shot 36, and dumps the binary sequence 11100100 into shift register 12 in reverse order as shown. The register immediately begins shifting to the right and recirculating in ring fashion at the clock rate, and the serial outputs from each stage, corresponding to the eight phases of the frame synchronization word, are coupled through enabled AND gates 24 and OR gates 38 to the signal multipliers 40. The multipliers are also supplied with the burst signal applied to input terminal 14 and amplified by amplifier 42, thereby providing for the simultaneous multiplication of the incoming frame synchronization word with each of its eight phases.

The outputs from multipliers 40 are applied to integrators 44, which are conventional operational amplifiers with capacitive feedback, and the integrator outputs are in turn applied to the decoder decision circuit 46. The multipliers, integrators, and decoder decision circuit together form a correlation detector or digital matched filter. The multipliers and integrators per se are old in the art and will not be described herein in detail. A further explanation of them may be found in chapter 7 of the "Digital Communications With Space Applications" text cited above. The decoder decision circuit 46 is designed to sample the integrator outputs on demand and raise a selected one of a number of output lines corresponding to the integrator having the highest output or stored value.

As the shift register 12 is stepped around each stage generates, in serial fashion, one of the eight phases of the frame synchronization word, as mentioned above. The output of stage No. 8 is shown in FIG. 2*f*, by way of example, and it may be seen that this sequence is out of phase with the reference by comparing it with FIG. 2*b*. When the waveforms are multiplied together and integrated in the correlation detector, the integrator output assumes the pattern shown in FIG. 2*g*. It will be noted that its value is always either zero or negative, and that it never crosses the origin into the positive region.

Five clock periods after the framing acquisition is initiated in the receiver, the first bit of the reference phase of the frame synchronization word appears in the burst signal. By this time the 1-bit that was originally in stage No. 8 has advanced around to stage No. 5. The serial output waveform from shift register stage No. 5 is shown in FIG. 2*h*, and it is seen to be exactly in phase with the incoming frame synchronization word in FIG. 2*b*. When the waveforms of FIGS. 2*b* and 2*h* are multiplied together and integrated in the correlation detector, the integrator output appears as a positive, steadily increasing ramp function as shown in FIG. 2*i*. All of the other integrator outputs will be either zero or very negative, similar to the one shown in FIG. 2*g* for stage No. 8.

After a predetermined delay of between three and four word lengths, the output of single shot 36, FIG. 2*j*, drops again, which triggers pulse generator 48. The latter produces a framing decision pulse, FIG. 2*k*, which actuates the decoder decision circuit 46 and sets flip-flop 50. The decoder decision circuit raises a signal on the output line corresponding to shift register stage No. 5, thus identifying it as the stage producing the in phase sequence, which sets flip-flop 32. This in turn energizes decoder 52 which subsequently produces an output pulse, FIG. 2*m*, each time the binary sequence shown at its eight input lines is present in shift register 12. As is apparent, this sequence occurs in the shift register at the beginning of each word or frame period of the incoming burst signal. The pulse from decoder 52 is applied to OR gate 54 whose output conditions AND gate 56, sets flip-flop 30, and clears flip-flop 20. The raised output signal from flip-flop 30 continuously conditions AND gate 56 so that it issues the desired system framing pulse at terminal 58 each time decoder 52 produces a pulse. The output of AND gate 56 is shown in FIG. 2*n*.

The setting of flip-flop 50 by the decision framing pulse produces an output from OR gate 60, FIG. 1, that dumps the values stored in the integrators, i.e. discharges their feedback capacitors, to prepare them for the forthcoming data decoding operation. When single shot 36 was triggered at the beginning of the frame synchronization period, its raised output changed the integrator circuits by connecting an additional capacitor in each of their feedback paths. This is necessary because the integrators must function linearly over a longer period of time than is required in the data decoding mode. When the output of single shot 36 drops these additional capacitors are disconnected from the integrators.

When flip-flop 20 is cleared or reset by the pulse from OR gate 54, the lowered output on line 22, FIG. 2*e*, disables AND gates 24 and blocks further outputs from shift register 12 from reaching the multipliers 40, while the raised signal on line 26 enables or conditions AND gates 28. The other inputs for these gates on lines 62 are derived from a replica store generator of the type disclosed in copending U.S. Pat. application Ser. No. 646,679, filed June 16, 1967 by William G. Schmidt entitled, BIORTHOGONAL CODE GENERATOR and assigned to the assignee of this invention. In the data decoding mode the replica signals represent the various phases or sequences of an orthogonal code pattern. They are passed through AND gates 28 and OR gates 38 to the multipliers 40 for correlation detection with the incoming data burst. At the end of each frame period during the data mode, a dump pulse is fed to the integrators through OR gate 60 from a source, not shown, to discharge the integrator capacitors and prepare them for the next frame period.

As may now be more fully appreciated, the correlation detector, including the multipliers 40, the integrators 44 and the decoder decision circuit 46, form part of the data decoding circuitry of the receiver, and the utilization of this circuitry to achieve frame synchronization as well results in considerable hardware economies as compared with prior art systems. In addition, the hardware economy also reduces the weight of the overall receiver system, which can be a critical factor when it is carried in a satellite in a space communications system.

While the invention has been particularly shown and described with reference to a preferred embodiment thereof, it will be understood by those skilled in the art that various changes in form and details may be made therein without departing from the spirit and scope of the invention.

I claim:

1. A frame synchronization system for an orthogonal decoder having an *n* bit frame length and including a correlation detector having first and second groups of *n* input terminals and *n* output terminals, comprising:

a. means for receiving an incoming burst signal including a data portion preceded by a repeated sequence of an *n* bit word having good autocorrelation properties, b. means for individually applying the signal to the first group of input terminals of the correlation detector, c. means for simultaneously generating each of the possible phases of the word, d. means for individually applying the generated phases to the second group of input terminals of the correlation detector, and e. means responsive to a signal on one of the *n* output terminals of the correlation detector identifying the generated phase of the word that is in phase with the received word for generating a frame synchronization pulse at the beginning of each framing period.

2. A frame synchronization system as defined in claim 1 wherein the means recited in subparagraph (*c*) comprises a recirculating shift register having *n* stages originally loaded with one of the phases of the word.

3. A frame synchronization system as defined in claim 2 wherein the means recited in subparagraph (*e*) of claim 1 comprises a decoder that produces an output pulse whenever the first bit of the in phase sequence of the word is in the register stage identified by the correlation detector.

4. A frame synchronization system as defined in claim 1 further comprising means for initiating the generating means recited in subparagraph (*c*) and enabling the applying means recited in subparagraph (*d*) in response to the acquisition of clock pulses.

5. A frame synchronization system as defined in claim 2 further comprising means for loading the shift register and enabling the applying means recited in subparagraph (*d*) of claim 1 in response to the acquisition of clock pulses.

6. A frame synchronization system as defined in claim 1 further comprising means for resetting the correlation detector to receive the data portion of the burst signal after a predetermined time delay.